United States Patent [19]
Abbott et al.

[11] Patent Number: 4,649,926
[45] Date of Patent: Mar. 17, 1987

[54] ULTRASONIC COMPOUND SCAN WITH ROTATING TRANSDUCER

[75] Inventors: John G. Abbott, Kaiseraugst; Christoph B. Burckhardt, Muttenz; Pierre-André Grandchamp, Münchenstein; Peter Krummenacher, Gipf-Oberfrick; Claude Schlaepfer, Wallbach, all of Switzerland

[73] Assignee: Kontron Holding AG, Zurich, Switzerland

[21] Appl. No.: 779,187

[22] Filed: Sep. 23, 1985

[30] Foreign Application Priority Data

Sep. 25, 1984 [CH] Switzerland ............... 4575/84

[51] Int. Cl.⁴ ............................................ A61B 10/00
[52] U.S. Cl. .................................. 128/660; 73/626
[58] Field of Search ..................... 128/660–663; 73/618–626

[56] References Cited

U.S. PATENT DOCUMENTS

| | | | |
|---|---|---|---|
| 4,034,744 | 7/1977 | Goldberg | 128/2 V |
| 4,159,462 | 6/1979 | Rocha et al. | 128/661 X |
| 4,161,122 | 7/1979 | Bucher | 73/626 |
| 4,231,373 | 11/1980 | Waxman et al. | 128/660 |
| 4,233,988 | 11/1980 | Dick et al. | 128/660 |
| 4,269,066 | 5/1981 | Fischer | 128/660 X |
| 4,287,767 | 9/1981 | Kretz | 128/660 X |
| 4,383,447 | 5/1983 | Kretz | 128/660 X |
| 4,407,293 | 10/1983 | Suarez, Jr. et al. | 128/660 |
| 4,410,826 | 10/1983 | Waxman et al. | 310/336 |
| 4,478,083 | 10/1984 | Hassler et al. | 128/660 X |

FOREIGN PATENT DOCUMENTS 2719130  1/1978  Fed. Rep. of Germany .
2097534 11/1982  United Kingdom .

Primary Examiner—Kyle L. Howell
Assistant Examiner—Francis J. Jaworski
Attorney, Agent, or Firm—Jon S. Saxe; Bernard S. Leon; George W. Johnston

[57] ABSTRACT

A real time method and apparatus is disclosed for scanning large body areas to produce an ultrasound cross-sectional picture of a body in which method at least two different and partially overlapping sector scans of the body are carried out in one scanning plane by the pulse-echo method utilizing single ultrasound array. The array is rotatable about an axis of rotation perpendicular to the scanning plane and comprises at least a first and a second transducer, disposed in spaced relationship along a circle which is situated in the scanning plane and which is concentric with the axis of rotation. Out of at least two different scans, one is performed with the first transducer and the other with the second, each transducer being used both for the emission of ultrasound pulses and for the reception of echo waves and the position of the axis of rotation with respect to the body remaining unchanged during all the scans.

41 Claims, 14 Drawing Figures

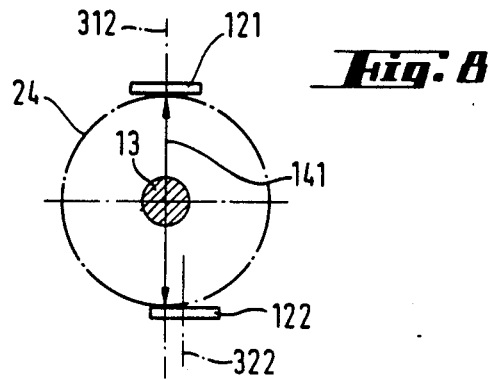
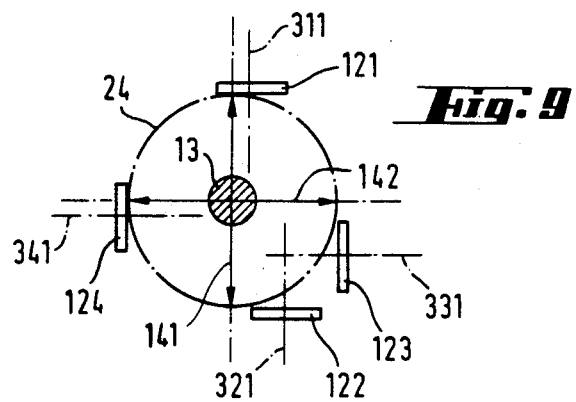

ULTRASONIC COMPOUND SCAN WITH ROTATING TRANSDUCER

DESCRIPTION

This invention relates to a method and apparatus for producing an ultrasound cross-sectional image of a body, in which at least two different and partially overlapping sector scans of the body are carried out in one scanning plane by the pulse-echo method using a single ultrasound transducer array which is rotatable about an axis of rotation perpendicular to the scanning plane. The array comprises at least two transducers which are disposed in spaced relationship along a circle which is situated in the scanning plane and which is concentric with the axis of rotation, with the transducer array performing a rotary movement about the axis of rotation.

PRIOR ART

In abdominal and pre-natal gynecological ultrasound diagnosis and in the examination of soft parts of the body it is customary to use the two-dimensional B-image method. In this method an area under examination is scanned line-wise with the ultrasound beam. There are various techniques for displacing the ultrasound beam as required to build up the ultrasound picture. In addition, a distinction is made between the compound scanning method, also known as the slow B-image method, and the real-time method, also known as the fast B-image method.

In the classical compound scanning method an ultrasound transducer comprising a single monolithic transducer is passed over the skin with the interposition of a coupling medium, whereby a combination of parallel and angular displacements of the transducer is carried out. The position of the transducer at any time is transmitted to an electrical deflection circuit to deflect the electron beam of the display unit in the direction of the associated ultrasound beam. In this way the ultrasound picture is built up line by line. In this method image storage must be used for the display because the image build-up is relatively slow and takes, for example, half a minute to some two minutes per image. On the other hand, the method has a number of advantages:

1. The granularity ("speckle noise") of the image is reduced. As a result, grey tone differences between different tissue parts are more readily visible and structures of different tissues such as, for example, tumors and cysts, are more easily recognized.
2. The depiction of tissue and organ boundaries is improved. Since such boundaries reflect the ultrasound waves, the transducer delivers a maximal echo signal when the ultrasound beam is vertically incident to the boundary surface. There is a high probability that this condition is satisfied in compound scanning because the body under investigation is subjected to ultrasound pulses from a number of different directions.

The disadvantages of the classical compound scanning method are as follows:

1. It is not possible to obtain a real-time display of movements because with the slow image build-up only a static storage image can be produced, and this has to be erased for a new image build-up.
2. The time taken for the examination is relatively long.
3. Artifacts caused by organ movements during the slow picture build-up can have an adverse effect on picture quality.
4. The equipment required and the operating techniques are relatively complex.
5. Particularly when the transducer is moved manually, the picture quality depends very much on the operator's skill. In order to obtain usable pictures, therefore, the operator must undergo suitable training. Pictures taken of the same object by different operators usually differ, even if they have equivalent training and experience.

In contrast to the classical compound scanning method, the real time method is characterized by a rapid picture build-up. Each picture can be produced in fractions of a second by mechanical or electronically controlled scanning. In the real time method the image repetition frequencies obtained can exceed 15 pictures per second.

The main advantage of the real time method is the relatively short examination time with comparable god resolution and sufficient grey graduation. Also, the relatively high image repetition frequency enables movements to be shown in real time, i.e. movements can be observed directly during the examination. Other advantages of the real time method include the achievement of picture reproducibility (i.e. picture quality is less dependent on the manual skill of different operators), lower equipment costs, and simpler equipment operation.

One important disadvantage of the real time method in comparison with the compound scanning method is that the display of different soft parts is less satisfactory. For one, the grey tone differences are less clearly visible due to greater image speckle noise. Also the depiction of tissue and organ boundaries is not as good because the real time method does not offer the possibility of subjecting the object under examination to ultrasound wave pulses from different directions.

There is accordingly a need for a method and apparatus by means of which the advantages of the above two scanning methods can be achieved without the need to accept the disadvantages of those methods. This need is particularly felt in medical diagonosis.

The aim of the invention, therefore, is to provide a method, and apparatus by means of which it is possible to achieve the advantages of both the compound scanning method and of the real time method while substantially obviating the disadvantages of these two methods.

SUMMARY OF THE INVENTION

According to the invention, this aim is achieved by an ultrasound imaging method characterized in that: p1 (a) out of the at least two different scans, one is performed with the first transducer and the other with the second, each transducer being used both for the emission of ultrasound pulses and for the reception of echo waves, and (b) the position of the axle of rotation with respect to the body remains unchanged during all the scans.

The invention is also embodied in apparatus comprising a single ultrasound transducer array which is rotatable about an axle of rotation perpendicular to the scanning plane. The array comprises at least first and second transducers which are disposed in spaced relationship along a circle which is situated in the scanning plane and which is concentric with the axle of rotation. The cross-section of each transducer in the scanning plane has an axis of symmetry perpendicular to and passing through the centerpoint of the emission surface of the respective transducer. This scanner is adapted to cooperate with a drive mechanism to effect a rotary movement of the transducer array, and with a transceiver unit. The scanner embodiment is further characterized in that the axes of symmetry of the cross-sections of transducers disposed successively along the circle intersect at a point spaced from the centerpoint of the circle.

In an alternate embodiment the transducers of at least one pair are disposed at opposite ends of a diameter of the circle and either the axes of symmetry of the cross-sections of the two transducers forming a pair extend parallel to and on the same side of the diameter, or the axis of symmetry of one of the transducers coincides with the diameter and the axis of symmetry of the other transducer extends parallel to the diameter.

The invention is also embodied in an ultrasound scanner for use with ultrasound imaging system for producing cross-sectional pictures of a body, said scanner comprising (a) a single ultrasound transducer array which is rotatable about an axle of rotation perpendicular to the scanning plane and which comprises
 (i) at least first and second transducers which are disposed in spaced relationship around a circle which is situated in the scanning plane and concentric with axle of rotation,
 (ii) the cross-section of each transducer in the scanning plane having an axis of symmetry perpendicular to and passing through the center point of the emission surface,
 (iii) and the axes of symmetry of the cross-sections of transducers disposed successively along the circle intersecting at a point offset from the center point of the circle;
(b) a drive mechanism by means of which a rotary movement of the transducer array can be effected about the axle of rotation.

In an alternate embodiment the ultrasound scanner comprises
 (i) at least one pair of transducers which are disposed in spaced relationship around a circle which is situated in the scanning plane and is concentric with the axle of rotation,
 (ii) the cross-section of each transducer in the scanning plane having an axis of symmetry perpendicular to and passing through the centerpoint of the emission surface of the transducer,
 (iii) said one pair of said transducers being disposed at opposite ends of a diameter of the circle and having either the axes of symmetry of the cross-sections of the two transducers forming said pair extending parallel to and on the same side of the diameter, or the axis of symmetry of one of the transducers of said pair coinciding with the diameter, and the axle of symmetry of the other transducer extending parallel to the diameter.

Reference should also be made to a related system employing some common components and techniques which is disclosed in concurrently filed and commonly owned application Ser. No. 779,189 filed Sept. 23, 1985, entitled "Ultrasonic Compound Scan with an Oscillating Transducer".

With the method and apparatus according to the invention it is possible to produce an ultrasound cross-sectional picture of a body which combines the above advantages of the conventional compound scanning method (the slow B-image method) with those of the real-time method (fast B-image method) while avoiding the disadvantages of both. The advantages achieved by the invention are as follows:

The ultrasound images produced have a low granularity ("speckle noise") so that grey tone differences between similar tissues can be recognized more easily.

Tissue and organ boundaries are clearly recognizable in the resulting pictures.

Since the method according to the invention can be performed with a transducer which can be disposed very close to the body and which can perform a relatively fast rotary movement, it is possible to obtain a relatively high image repetition frequency and thus show movements in real time.

Due to the relatively high image repetition frequency obtained, organ movements during the scan do not have an adverse effect on picture quality.

The range of applications of the invention is very wide. Using a transducer adapted for the specific application it is possible, for example, to examine different parts of a patient's body. The invention is particularly advantageous when applied to real-time ultrasound diagnosis of the abdominal organs. Due to the image repetition frequency values achieved with the invention it is also suitable for cardiac examination.

The pictures obtained are distinguished by very good reproducibility, i.e. the picture quality obtained is substantially independent of the manual skill of the operator.

The width of the scanned area at and near the surface of the skin is larger than in the case of a sector scan.

It is a relatively simple matter to perform the method according to the invention and the examination time required for the purpose is very short.

The method according to the invention can be carried out with relatively little outlay in terms of apparatus.

Further advantages and features of the invention will be apparent from the following description of exemplary embodiments. These are illustrated in the accompanying drawings wherein:

BRIEF DESCRIPTION OF THE DRAWINGS

FIGS. 2 to 9 are schematic diagrams illustrating spatial relationships in certain embodiments of the ultrasound transducer array of FIG. 1, FIGS. 10–12 are schematic diagrams illustrating various element arrangements of the transducers of FIGS. 1–9, FIGS. 13 and 14 are perspective views showing the use of the apparatus according to the invention and its associated ultrasound scanner, in the examination of a patient.

DETAILED DESCRIPTION OF THE PREFERRED EMBODIMENTS

Figure 1:
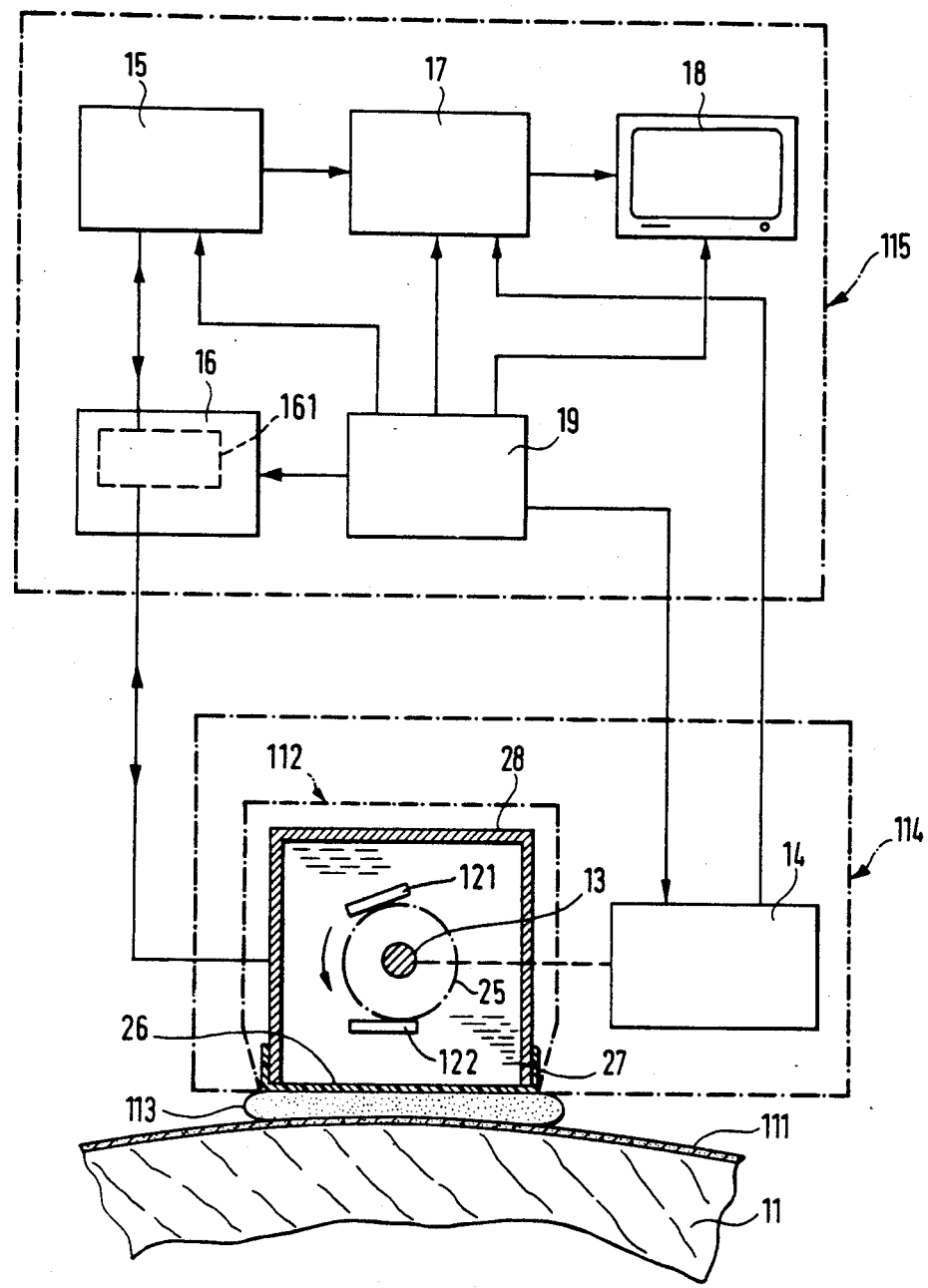
FIG. 1 is a block diagram of the system according to the invention.
Figure 2:
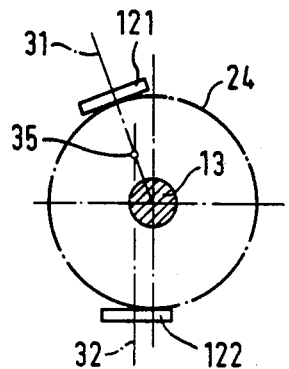

FIG. 1 diagrammatically illustrates an ultrasound imaging system for performing the method according to the invention.

The system includes an ultrasound scanner 114 and a signal processing unit 115. Ultrasound scanner 114 comprises in turn an ultrasound transducer unit 112 and a drive mechanism 14.

The signal processing unit 115 shown in FIG. 1 comprises a transceiver unit 15, an element connector 16, an image signal processing unit 17, a television monitor 18 for the ultrasound picture display, and a control unit 19.

As shown in FIG. 1 transducer unit 112 comprises a single ultrasound transducer array which illustratively comprises two transducers 121, 122 disposed on a carrier 25. The array is rotatable about an axle of rotation 13 perpendicular to the scanning plane with the cross-sections of the carrier 25 and axle of rotation 13 being concentric. The entire assembly is enclosed in a container formed by a housing 28 and a diaphragm 26 permeable to ultrasound, e.g. consisting of plastics. The container is filled with a transmission liquid 27, e.g. castor oil.

Each transducer of the array is preferably a single monolithic transducer but may be a segmented transducer.

When monolithic transducers are used, the emission surface of each transducer may be for example, either circular or annular. Alternatively, the surface may be flat or have a curvature enabling the ultrasound waves to be focused. A curvature of this kind may be for example, spherical, hyperbolic or conical.

When segmented transducers or corresponding arrays of transducer elements are used, they may have various forms:

In order to achieve what is known as dynamic focusing it is advantageous, for example, to use a transducer comprising a plurality of concentric annular arrays of transducer elements. The emission surface of this array may be flat, spherical or conical.

In order to reduce the lateral maxima of the ultrasound field it is advantageous to use an annular array of transducer elements. The emission surface of this array may be flat, spherical or conical.

When the transducer is required to produce an ultrasound beam which is movable and/or electronically focusable with respect to the transducer, it is advantageous to use an elongate array of adjacent transducer elements. The emission surface of this array may be flat, spherical or cylindrical or appear as a V-shaped line in cross-section.

In one preferred embodiment which will be described in detail below, each of the transducers 121, 122 in FIG. 1 comprises a monolithic ultrasound transducer.

The transducer is formed as a rigid unit with its emission surface preferably spherical, but alternatively cylindrical or flat.

A rotary movement may be imparted to the transducer array using the drive mechanism 14 controlled by the control unit 19. The drive mechanism comprises a drive motor and a selsyn. The lattr delivers a signal corresponding to the instantaneous position of the transducer array, and this signal is fed to the image signal processing unit 17. The drive mechanism may, however, utilize a simpler construction which avoids a control circuit but incorporates an ordinary selsyn. Alternatively, a stepping motor may be used for the drive.

The transceiver unit 15 generates the transmission signals for the transducer elements in the transducer array, and processes the echo signals delivered by the transducer elements in order to produce picture signals.

The element connector 16 is connected between the transceiver unit 15 and the transducer array and serves electrically to connect individual transducers of the array to the transceiver 15.

When the transducer unit comprises segmented transducers and provision is made to use the transducer elements in groups, the transducer connector 16 includes an element selector 161 which is intended to select at least two different groups of adjacent transducer elements of the transducer and electrically connect them to the transceiver unit 15. Preferably, the element selector 161 so selects the groups of transducer elements that the groups are of equal widths and the distance between the center points or the emission surfaces of the different groups is equal to approximately half the width of each group.

Individual pictures are recorded by scanning the body 11 with at least two different transducers of the array or with at least two transducer elements or element groups, or by using at least two different groups of transducer elements of one of the transducers. The purpose of the picture signal processing unit 17 is to carry out electronic compounding, i.e. to assemble these individual pictures to give a compound picture. For this purpose, the unit 17 comprises means for storing and associating the image signals delivered by the transceiver unit and means for transmitting the resulting image signals corresponding to the compound image to the television monitor 18.

For further details of the construction and operation of the unit 17 and other system components, reference should be made to the concurrently filed and commonly owned U.S. patent application No. 779,186 entitled "Real-time Display of an Ultrasonic Compound Image".

The television monitor 18 displays a picture produced by the above-mentioned compounding of individual pictures.

The control unit 19 controls the function of the drive mechanism 14, the transceiver unit 15, the element connector 16, the image signal processing unit 17, and the television monitor 18.

FIGS. 2 to 9 are diagrams of some embodiments of the transducer array of FIG. 1, situated in the scanning plane. In each of FIGS. 2 to 9 the position of the transducer carrier 25 is denoted by a circle 24. As seen in the drawings, the transducers are disposed along this circle and in spaced relationship, and the cross-section of each transducer in the scanning plane has an axis of symmetry extending perpendicularly to and through the centerpoint of the emission surface of the transducer. As shown in FIGS. 2–9, the transducers can be disposed in different positions with respect to the axes of symmetry of the carrier.

A common feature of the transducer arrays shown in FIGS. 1 to 6 is that the axes of symmetry 31, 32 (FIG. 2–3) and 31–33 (FIGS. 4–6) of the cross-sections of transducers disposed successively along circle 24, intersect at a point 35 (FIGS. 2–5), and 36 and 37 (FIG. 6), which points are offset from the centerpoint of the circle 24.

Figure 7:
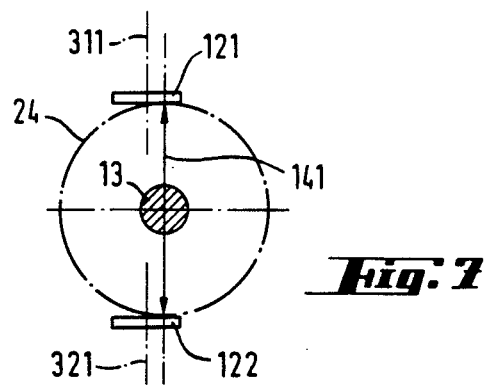

A common feature of the transducer arrays shown in FIGS. 7-9 is that each of these arrays comprises at least one pair of transducers 121, 122 (FIGS. 7-9) or 123, 124 (FIG. 9); the transducers of at least one pair are disposed at opposite ends of a diameter 141 (FIGS. 7-9) or 142 (FIG. 9) of the circle 24. Further, in one case the axes of symmetry 311, 321 (FIGS. 7, 9) and 331, 341 (FIG. 9) of the crosssections of the two transducers forming a pair extend parallel to and on the same side of the diameter 141 (FIGS. 7, 9) and 142 (FIG. 9). In another case the axis of symmetry 312 of one of the transducers coincides with the diameter 141 and the axis of symmetry 322 of the other transducer extends parallel to the diameter 141 (see FIG. 8).

Figure 3:
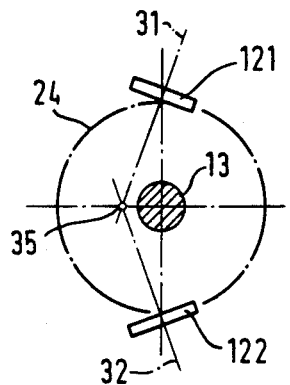
Figure 4:
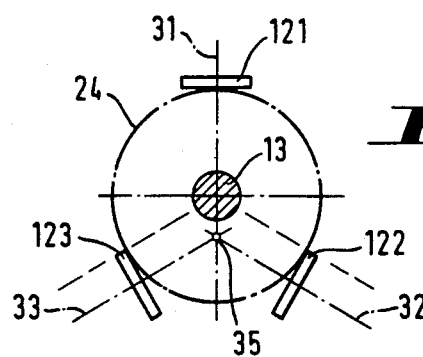
Figure 5:
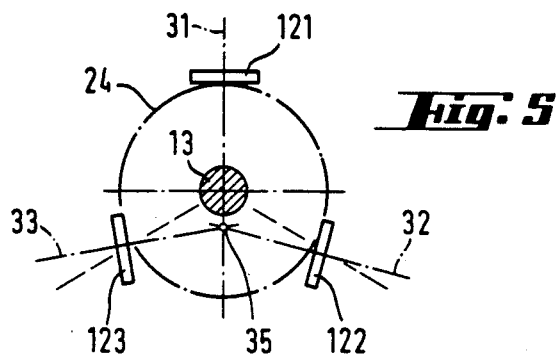
Figure 6:
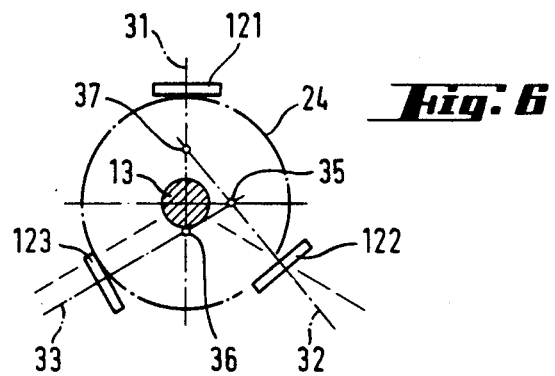

In the transducer arrays shown in FIGS. 3 and 5, the transducers are disposed at uniform intervals along the circle. In the transducer arrays of FIGS. 2, 4, 6–9, on the other hand, the transducers are disposed at nonuniform but approximately equal intervals.

Preferably, the emission surfaces of all the transducers of the arrays shown in FIGS. 1–9 are of equal widths. When a transducer array of this kind is used, it is also advantageous to select the arrangement of the individual transducers along the circle 24 (in FIGS. 2–9) such that the transducers occupy different positions with respect to the body under examination when, as a result of rotation of the transducer array, each transducer is rotated into a position between the centerpoint of circle 24 and the body under examination with its axis of symmetry directed perpendicularly to the contact surface) between the transducer system and the body under examination. The distance between the positions occupied by the centerpoints of the emission surfaces of transducers which reach such different positions one after the other is approximately half the width of the emission surface of one of the transducers. This is acheived, for example, with the transducer arrays shown in FIGS. 7 and 9.

In the above-described embodiment of the transducer array the emission surface of the individual transducers can be spherical, cylindrical, conical or flat.

As explained below with reference to FIGS. 10–12, each of the transducers (e.g. 121, 122 in FIG. 1) of the array can be segmented into adjacent transducer elements and formed as a rigid unit. Segmentation of the transducer can be obtaind by segmentation of its energization electrodes. The emission surfaces of the transducer element may have different shapes resulting from the shape of the electrodes used.

Figure 10:
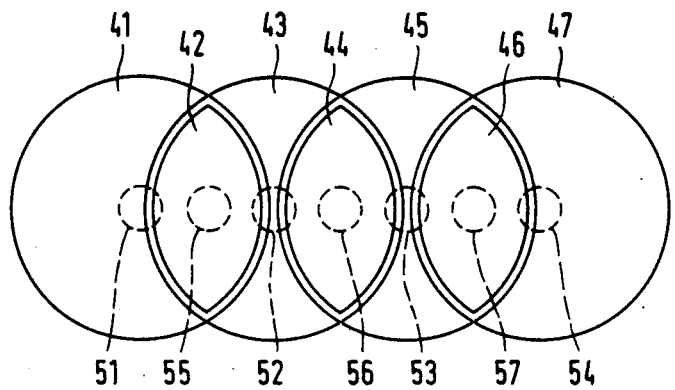
Figure 11:
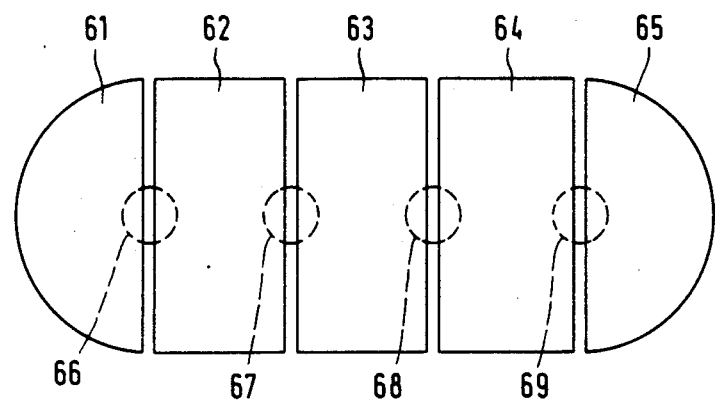
Figure 12:
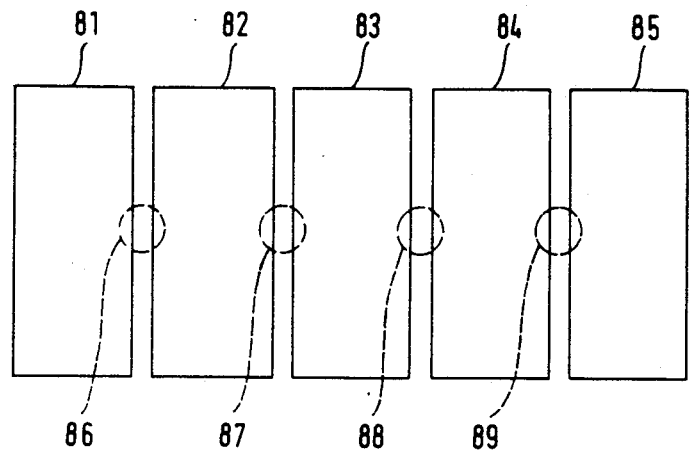

FIGS. 10–12 diagrammatically illustrate embodiments of the transducers 121 and 122 having different transducer element segmentations. In the embodiment shown in FIG. 10, the area covered by the transducer electrodes is made up of circular surface segments 41–47. Similarly, in the embodiments shown in FIGS. 11 and 12, the transducer is divided into elements 61–65 and 81–85, respectively.

In order to focus the ultrasound beam or the reception response that can be produced with the transducer shown in FIGS. 10, 11 or 12 different delays in the transmission signals or in the echo signals from the individual transducer elements may be provided instead of or in addition to curvature of the transducer emission surface.

Different ultrasound beams can be produced by the use of different groups formed with the transducer elements.

In the case of FIG. 10, a center of symmetry 51, 52, . . . 57 of the cross-section of an ultrasound beam may be produced by different groupings of the transducer elements. Different combinations are shown in Table 1.

TABLE 1

| Group | Transducer elements | Center of symmetry |
| --- | --- | --- |
| 1 | 41, 42 | 51 |
| 2 | 42, 43, 44 | 52 |
| 3 | 44, 45, 46 | 53 |
| 4 | 46, 47 | 54 |
| 5 | 41, 42, 43, 44 | 55 |
| 6 | 42, 43, 44, 45, 46 | 56 |

TABLE 1-continued

| Group | Transducer elements | Center of symmetry |
| --- | --- | --- |
| 7 | 44, 45, 46, 47 | 57 |
| 8 | 41, 42, 43, 44, 45, 46 | 52 |
| 9 | 42, 43, 44, 45, 46, 47 | 53 |
| 10 | 41, 42, 43, 44, 45, 46, 47 | 56 |

Individual pictures having different amounts of speckle noise can be produced by scanning a body with combinations of groups 1 to 10. By electronically combining a plurality of these individual pictures it is possible to produce a compound picture in which the organ and tissue boundaries are more clearly visible than in the case of individual pictures.

In the embodiment shown in FIG. 11, the transducer comprises the transducer elements 61–65. Each small circle 66–69 represents approximately the center of symmetry of the cross-section of an ultrasound beam produced with a group of two adjacent transducer elements. Like the transducer shown in FIG. 10, combinations of the transducer elements of FIG. 11 can be used to produce a compound picture for the purpose of a higher order compounding. Various combinations are listed in Table 2.

TABLE 2

| Group | Transducer elements |
| --- | --- |
| 1 | 61, 62, 63 |
| 2 | 62, 63, 64 |
| 3 | 63, 64, 65 |
| 4 | 61, 62, 63, 64 |
| 5 | 62, 63, 64, 65 |
| 6 | 61, 62, 63, 64, 65 |

The above description with respect to the embodiments shown in FIGS. 10 and 11 applies as well to the transducer shown in FIG. 12 which includes elements 81–85 and which may be controlled to provide centers of symmetry at 86, 87, 88 or 89.

When the apparatus described above operates, for example with a transducer of the kind shown in FIG. 12, the element selector 161 is advantageously controlled to obtain good transverse resolution. This may be accomplished by utilizing transducer elements having symmetrically configured emission surfaces such that the axes of symmetry of the emission surfaces of the individual groups come to lie either in the gaps between two adjacent transducer elements or at the center of the emission surface of a transducer element. Preferably these conditions are satisfied at least once during a complete working cycle with the axes of symmetry of the emission surfaces of the selected groups occupying each possible position in the gaps between two adjacent transducer elements or at the center of a transducer element, possible exceptions being only the boundary transducer elements, e.g., the first half of the first group and the second half of the last group of the transducer unit.

In a preferred embodiment, the element selector 161 is so arranged that during scanning with one of the transducers different groups of transducer elements of the transducer are alternately connected to the transceiver unit 15.

In operation and as shown in FIG. 1, the transducer system 112 is applied to the skin 111 of the part of the body 11 under examination. A transmission gel 113 is applied between the transducer system diaphragm 26 and the patient's skin. The apparatus is then operated with the transducer array performing a continuous rotary movement about the axle 13 to scan the examined body.

In order to perform the method of the invention with a transducer array comprising monolithic transducers, at least two sector scans are carried out which overlap only partially. When a transducer array of the kind shown in FIGS. 2, 3, 7 or 8 is used, one of the sector scans is carried out with the transducer 121 for example and the other with the transducer 122. With the transducer arrays of FIGS. 4–6 or 9, which may comprise three or four transducers, it is of course possible to carry out additional scans of this kind. In each of these scans, each used transducer element serves both for the emission of ultrasound pulses and for the reception of echo waves. This emission and reception takes place during the rotatory movement of the transducer array.

In all the scans of the body 11 carried out in this way, the position of the axle of rotation 13 with respect to the body 11 remains unchanged.

When performing scans with the transducer array having segmented transducers, there is preferably used at least two different groups of adjacent transducer elements of each transducer selected by the element selector 161 (e.g. the groups described above with reference to FIGS. 10–12), each group being used both for the emission of ultrasound pulses and for the reception of echo waves.

With the above described method, therefore, at least two different and partially overlapping sector scans of the body are carried out by the pulse echo process, in one scanning plane and with a single ultrasound transducer system. Thus different individual pictures are recorded by these sector scans. The picture signals corresponding to each of these pictures are obtained from the echo signals by means of the transceiver unit 15 and are continuously stored in the image signal processor wall 17. An electronic combination of the different individual pictures produced by the sector scans is continuously carried out in unit 17 by suitable processing of the stored image signals. The compound picture produced by this combination is displayed by the television monitor 18.

As previously noted, in peforming the method with segmented transducers, the speckle noise in the resulting ultrasound pictures is reduced by using groups of transducer elements of equal widths, and by establishing a distance between the centers of the emission surfaces of the groups of transducer elements used for performing the different scans, which is equal to approximately half the width of the group. Also as previously noted, by controlling the location of the axes of symmetry of the emission surfaces, the number of scanning lines in the production of the cross-sectional pictures can be maximized.

Figure 13:
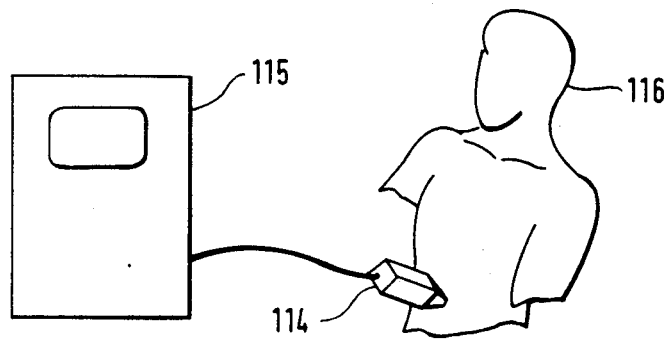
Figure 14:
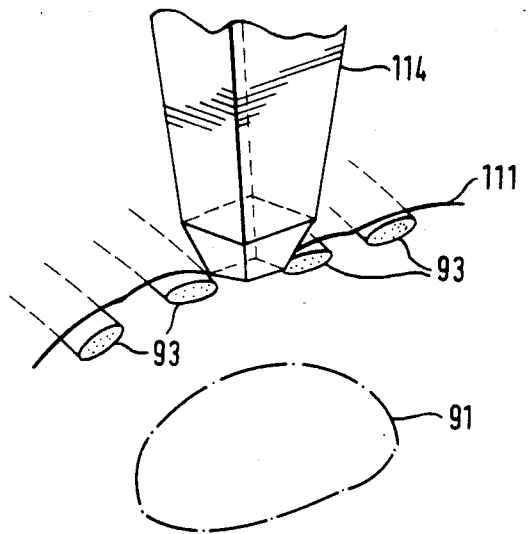

One use of the apparatus according to the invention for the examination of a patient is shown in FIGS. 13 and 14 which illustrate the arrangement of the scanner 114 with respect to the body 11 of the patient. The other system components are deployed in console 115. FIG. 14 shows the arrangement of the scanner 114 with respect to the heart 91 and ribs 93 of the patient during cardiac examination. During these examinations, the transducer array contained in the transducer system operates in the manner described above: it rotates about axle 13, emits ultrasound pulses through the patient's skin 111, and receives echo waves.

We claim:

1. A method of producing an ultrasound cross-sectional image of a body by carrying out at least two different and only partially overlapping sector scans of the body in one scanning plane by the pulse echo-method comprising:
   (a) rotating only one ultrasound transducer array which is rotatable about an axle of rotation perpendicular to the scanning plane and which comprises at least a first and a second transducer which are fixedly mounted on a rotatable carrier and which are disposed in spaced relationship along a circle situated in the scanning plane and concentric with the axle of rotation, said transducers having different relatie positions with respect to the radius which extends from the center of the axle of rotation and which passes through the center of the emission surface of the respective transducer,
   (b) performing a first scan with the first transducer and a second scan with the second transducer said second scan partially overlapping the first scan, each transducer being used both for directly transmitting ultrasound pulses to the body and for receiving echo waves therefrom, and
   (c) while scanning, maintaining unchanged the position of said axle of rotation of the transducer array with respect to the body.

2. A method according to claim 1 in which each transducer forms a rigid unit segmented into adjacent transducer elements, and wherein, in said scan performing step different groups of adjacent transducer elements of each transducer are used, each group being used both for the emission of ultrasound pulses and for the reception of echo waves.

3. A method according to claim 2 in which the emission surfaces of said groups of transducer elements are constructed in symmetrical configurations and controlled such that the axes of symmetry of the emission surfaces of the individual groups are situated either in the gaps between two adjacent transducer elements or at the center of the emission surface of a transducer element.

4. A method according to claim 3 in which the groups of transducer elements are so selected and controlled that at least once during an entire scan cycle and with respect to at least those transducer elements not at the boundary of the transducer, the axes of symmetry of the emission surfaces of the selected groups occupy each possible position in the gaps between two adjacent transducer elements or at the center of a transducer element.

5. A method according to claim 2 in which at least during the scan with one of said transducers, at least one of the groups of transducer elements is used alternately with another, different group, the groups each being used both for the emission of ultrasound pulses and also for the reception of echo waves.

6. An ultrasound scanner for use with an ultrasound imaging system for producing cross-sectional pictures of a body by carrying out at least two different and only partially overlapping sector scans of the body in one scanning plane by the pulse echo method, said scanner comprising:
   (a) only one ultrasound transducer array which is rotatable about an axle of rotation perpendicular to the scanning plane and which comprises
      (i) at least first and second transducers which are fixedly mounted on a rotatable carrier and which are disposed in spaced relationship around a circle situated in the scanning plane and concentric with the axle of rotation,
(ii) the cross-section of each transducer in the scanning plane having an axis of symmetry perpendicular to the emission surface of the transducer and passing through the center point thereof;
(iii) said transducers having different relative positions with respect to the radius which extends from the center of the axle of rotation and which passes through the center of the emission surface of the respective transducer;
(iv) the transducers being adapted for directly transmitting ultrasound pulses to the body and directly receiving echos therefrom when they are used for performing said sector scans;
(b) a drive mechanism by means of which a rotatory movement of the transducer array can be effected about the axle of rotation.

7. A scanner according to claim 6, in which the spacing of said transducers around said circle is non-uniform.

8. A scanner according to claim 6, in which the transducers are uniformly spaced around said circle.

9. A scanner according to claim 6, in which the emission surfaces of all the transducers of the transducer array are of equal widths.

10. A scanner according to claim 6, in which the transducer array comprises transducers whose emission surfaces are of equal widths and occupy different positions with respect to the body under examination when rotation of the transducer array positions each transducer between the center point of the circle and the body under examination with its axis of symmetry being directed perpendicularly to the contact surface of the body under examination, and wherein the distance between the positions occupied by the center points of the emission surfaces of adjacent transducers in said different positions corresponds approximately to half the width of the emission surface of one of the transducers.

11. A scanner according to claim 6 in which the emission surface of the individual transducers is spherical, cylindrical, conical or flat.

12. A scanner according to claim 6 in which at least one of the transducers forms a rigid unit and is segmented into adjacent transducer elements.

13. A scanner according to claim 12 in which said imaging system includes a transceiver unit and in which at least two different groups of adjacent transducer elements of the transducer are adapted to be electrically connected optionally to said transceiver unit.

14. A scanner according to claim 13 wherein each of the different groups of transducer elements operates with an emission surface made up of segments of circular surfaces.

15. A scanner according to claim 13, wherein each of the different groups of transducer elements operates with an emission surface made up of rectangular surfaces.

16. A scanner according to claim 13, wherein each of the different groups of transducer elements operates with an emission surface made up of segments of circular surfaces and of rectangular surfaces.

17. An ultrasound scanner for use with an ultrasound imaging system for producing cross-sectional images of a body by carrying out at least two different and only partially overlapping sector scans of the body in one scanning plane by the pulse echo method; comprising:

(a) only one ultrasound transducer array which is rotatable about an axle of rotation perpendicular to the scanning plane and which comprises
(i) at least one pair of transducers which are fixedly mounted on a rotatable carrier and which are disposed in spaced relationship around a circle situated in the scanning plane and concentric with the axis of rotation,
(ii) the cross-section of each transducer in the scanning plane having an axis of symmetry perpendicular to the emission surface of the transducer and passing through the center point thereof,
(iii) the transducers of said at least one pair of said transducers being disposed at opposite ends of a diameter of the circle and having either the axes of symmetry of the cross-sections of the two transducers forming said pair extending parallel to and on the same side of the diameter, or the axis of symmetry of one of the transducers of said pair coinciding with the diameter, and the axis of symmetry of the other transducer extending parallel to the diameter, the transducers being adapted for directly transmitting ultrasound pulses to the body and directly receiving echoes therefrom when they are used for performing said sector scans;
(b) a drive mechanism by means of which a rotary movement of the transducer array can be carried out about the axis of rotation.

18. A scanner according to claim 17, in which the spacing of said transducers around said circle is non-uniform.

19. A scanner according to claim 17, in which the transducers are uniformly spaced around said circle.

20. A scanner according to claim 17, in which the emission surfaces of all the transducers of the transducer array are of equal widths.

21. A scanner according to claim 17, in which the transducer array comprises transducers whose emission surfaces are of equal widths and occupy different positions with respect to the body under examination when rotation of the transducer array positions each transducer between the center point of the circle and the body under examination with its axis of symmetry being directed perpendicularly to the contact surface of the body under examination and wherein the distance between the positions occupied by the center points of the emission surfaces of adjacent transducers in said different positions corresponds approximately to half the width of the emission surface of one of the transducers.

22. A scanner according to claim 17 in which the emission surface of the individual transducers is spherical, cylindrical, conical or flat.

23. A scanner according to claim 17 in which at least one of the transducers forms a rigid unit and is segmented into adjacent transducer elements.

24. A scanner according to claim 23 in which said imaging system includes a transceiver unit and in which at least two different groups of adjacent transducer elements of the transducer are adapted to be electrically connected optionally to said transceiver unit.

25. A scanner according to claim 24 wherein each of the different groups of transducer elements operates with an emission surface made up of segments of circular surfaces.

26. A scanner according to claim 24, wherein each of the different groups of transducer elements operates with an emission surface made up of rectangular surfaces.

27. A scanner according to claim 24, wherein each of the different groups of transducer elements operates with an emission surface made up of segments of circular surfaces and of rectangular surfaces.

28. An ultrasound imaging apparatus for producing cross-sectional pictures of a body, comprising an ultrasound scanner according to claim or 7 or 18 or 8 or 19 or 9 or 20 or 10 or 21 or 11 or 22 or 12 or 23 or 13 or 24 or 14 or 25, and a transceiver coupled to said scanner for causing emissions therefrom and for processing echos received by said scanner.

29. An ultrasound imaging apparatus for producing cross-sectional pictures of a body, comprising an ultrasound scanner according to claim 6, and a transceiver coupled to said scanner for causing emissions therefrom and for processing echos received by said scanner.

30. Apparatus according to claim 29 in which each transducer forms a rigid unit and is segmented into adjacent transducer elements, and wherein said imaging apparatus further comprises an element selector connected between the transducer array and the transceiver unit for selecting at least two different groups of adjacent transducer elements of each transducer and electrically connecting each selected group to the transceiver unit.

31. Apparatus according to claim 30 in which the element selector so selects the groups of transducer elements that the emission surfaces of the groups are of equal widths and the distance between the center points of the emission surfaces of at least two different groups is equal approximately to half the width of the group.

32. Apparatus according to claim 30 in which the element selector so selects the groups of transducer elements that their emission surfaces are constructed in symmetrical configurations and the axis of symmetry of the emission surfaces of the individual groups lie either in the gaps between two adjacent transducer elements or at the center of the emission surface of one transducer element.

33. Apparatus according to claim 32 in which the element selector so selects the groups of transducer elements that at least once during an entire scan cycle and with the possible exceptions of boundary transducer elements, the axes of symmetry of the emission surfaces of the selected groups occupy each possible position in the gaps between two adjacent transducer element or at the center of a transducer element.

34. Apparatus according to claim 30 in which during the scan with one of said transducers in the element selector connects at least one pair of different groups of transducer elements of said transducer alternately to the transceiver unit.

35. An ultrasound imaging apparatus for producing cross-sectional pictures of a body, comprising an ultrasound scanner according to claim 17, and a transceiver coupled to said scanner for causing emissions therefrom and for processing echos received by said scanner.

36. Apparatus according to claim 35 in which each transducer forms a rigid unit and is segmented into adjacent transducer elements, and wherein said imaging apparatus further comprises an element selector connected between the transducer array and the transceiver unit for selecting at least two different groups of adjacent transducer elements of each transducer and electrically connecting each selected group to the transceiver unit.

37. Apparatus according to claim 36 in which the element selector so selects the groups of transducer elements that the emission surfaces of the groups are of equal widths and the distance between the center points of the emission surfaces of at least two different groups is equal approximately to half the width of the group.

38. Apparatus according to claim 36 in which the element selector so selects the groups of transducer elements that their emission surfaces are constructed in symmetrical configurations and the axis of symmetry of the emission surfaces of the individual groups lie either in the gaps between two adjacent transducer elements or at the center of the emission surface of one transducer element.

39. Apparatus according to claim 38 in which the element selector so selects the groups of transducer elements that at least once during an entire scan cycle and with the possible exceptions of boundary transducer elements, the axes of symmetry of the emission surfaces of the selected groups occupy each possible position in the gaps between two adjacent transducer element or at the center of a transducer element.

40. Apparatus according to claim 36 in which during the scan with one of said transducers in the element selector connects at least one pair of different groups of transducer elements of said transducer alternately to the transceiver unit.

41. An ultrasound scanner for use with an ultrasound imaging system for producing cross-sectional pictures of a body by carrying out at least two different and only partially overlapping sector scans of the body in one scanning plane by the pulse echo method, said scanner comprising
 (a) a single ultrasound transducer array which is rotatable about an axle of rotation perpendicular to the scanning plane and which comprises:
   (i) at least first and second transducers which are fixedly mounted on a rotatable carrier and which are disposed in spaced relationship around a circle situated in the scanning plane and concentric with the axle of rotation,
   (ii) the cross-section of each transducer in the scanning plane having an axis of symmetry perpendicular to the emission surface of the transducer and passing through the center point thereof,
   (iii) and the axes of symmetry of the cross-sections of the transducers forming different angles with the radius which extends from the center of the axle of rotation and which passes through the center of the emission surface of the respective transducer;
   (iv) the transducers being adapted for directly transmitting ultrasound pulses to the body and directly receiving echos therefrom when they are used for performing said sector scans;
 (b) a drive mechanism by means of which a rotary movement of the transducer array can be effected about the axle of rotation.

* * * * *